Feb. 21, 1956 R. F. STOCKTON 2,735,570
BASKET
Filed July 6, 1953

RAYMOND F. STOCKTON,
INVENTOR.

BY Hazard & Miller

ATTORNEYS

United States Patent Office 2,735,570
Patented Feb. 21, 1956

2,735,570

BASKET

Raymond F. Stockton, Sunland, Calif.

Application July 6, 1953, Serial No. 366,103

2 Claims. (Cl. 220—19)

This invention has to do with a flower holding container, and more particularly with a flower basket.

The principal object of this invention is to provide a basket that is constructed of a plurality of wires formed into a wire mesh and readily and easily secured to a container by virtue of a number of lugs or folded members.

Another object of this invention is to provide a basket constructed of wire mesh and having a container with tabs thereon, facilitating the lifting of the basket and holding the same in an easy transferable position.

A yet further object of this invention is to provide a basket for containing flowers or the like that is economical to manufacture and economical to assemble.

With the foregoing and other objects in view, which will be made manifest in the following detailed description and specifically pointed out in the appended claims, reference is had to the accompanying drawings for an illustrative embodiment of the invention, wherein:

Figure 1:
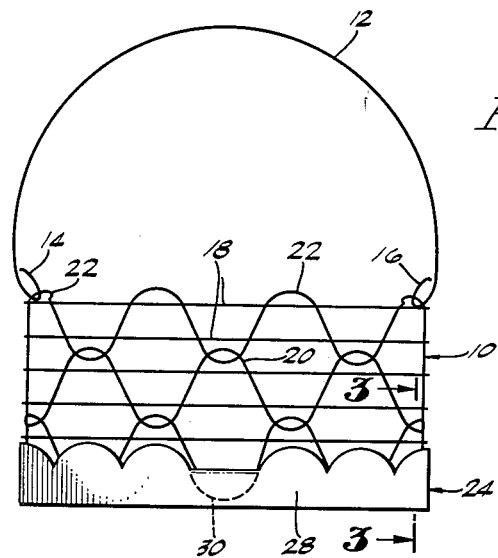
Figure 1 is a side view of the basket embodying the present invention.
Figure 2:
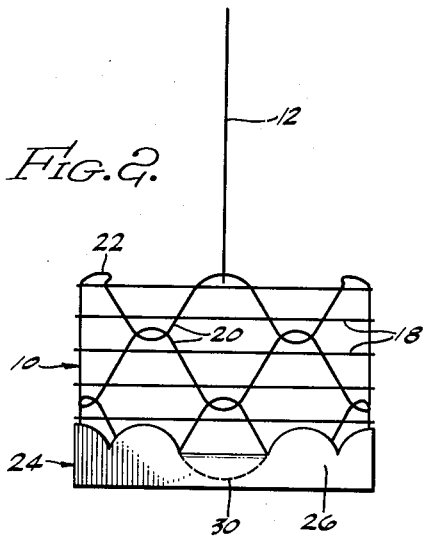
Fig. 2 is an end view of a basket embodying the present invention.

Referring to the accompanying drawings wherein similar reference characters designate similar parts throughout, 10 broadly designates a body constructed of wire mesh and having a handle 12 secured to the body by loops 14 and 16 respectively.

Body 10 is formed of a plurality of equally spaced parallel wires 18 interconnected by sinuously formed wires 20. Wires 18 and 20, respectively, are secured to each other to form an integral open wire mesh whole by spot welding at points of contact. Wires 20 are likewise spot welded to each other at the points of contact. The uppermost portions of uppermost wire 20 are provided with an inwardly bent or folded crests 22. Inwardly folded or bent crests 22 are to receive the stems of flowers placed within the basket and to retain the same therein.

Figure 3:
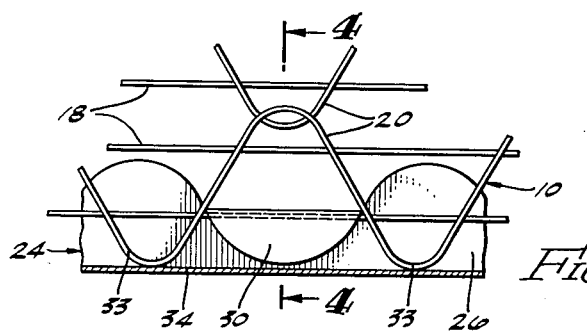
Fig. 3 is an enlarged fragmentary cross-sectional view taken on lines 3—3 of Figure 1, looking in the direction of the arrows.
Figure 4:
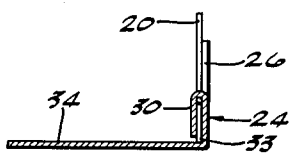
Fig. 4 is a fragmentary cross-sectional view taken on lines 4—4 of Fig. 3, looking in the direction of the arrows.

Wire mesh body 10 rests within a container 24 which is provided with upstanding marginal portions. The marginal portions consist of scalloped end and sidewalls 26 and 28, respectively. Formed in each end and sidewall, respectively, and inwardly bent over a wire 18 in a manner as illustrated in Fig. 3 of the drawings is a lug 30. The purpose of lug 30 is to secure the body 10 to the container 24. The lowermost portions of the convolutions of the lowest sinuously-shaped wire 20 bears against the bottom of the container so that as the lugs 30 are bent over portions of the horizontal wire 18 between the convolutions of the lowermost wire 20, a sturdy connection between the container 24 and the open mesh side walls is provided.

The container 24 is constructed of metal or any other material that may readily hold and contain water.

The particular form of the body 10, as illustrated, is not to be considered structure of limitation, but illustrates one form of forming wires into an open wire mesh to present a basket.

Figure 5:
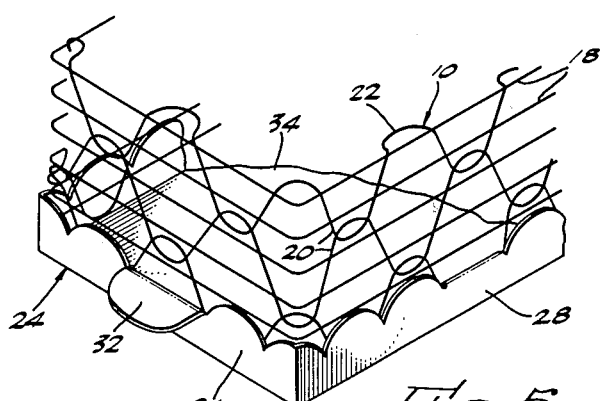
Figure 5 is a fragmentary perspective view illustrating a modified form of a basket embodying the present invention.

The modified form of the invention, as illustrated in Fig. 5 of the drawings, is identical to that illustrated in Figs. 1–4 inclusive, with the exception that the lugs formed in the end walls instead of being bent inwardly are bent outwardly to present a tab 32 that will facilitate the lifting and carrying of the basket. The number of tabs that may be provided is dependent upon the individual taste and upon the size of the basket. The number of lugs 30, like the tabs, depends upon individual taste and basket characteristics.

Those portions 33 formed in wires 20 that are in opposed relationship to crests 22 and which are in the closest proximity to the bottom 34 of the container 24 may rest thereupon to further lend to the support and stability of the body 10. The crests 22 may be inwardly bent in such a manner as to be parallel to the bottom 34 of the container, or they may be inclined from the vertical and yet not assume the aforementioned parallel position.

The loops 14 and 16 of the handle 12 are carried and supported by opposed and spaced apart crests 22.

Various changes may be made in the details of construction without departing from the spirit and scope of the invention as defined by the appended claims.

I claim:

1. A basket comprising open mesh wire side walls formed of sinuously-shaped and partially overlapped wires traversed by horizontal wires, said wires being mutually connected together at their points of contact with each other, an impervious bottom having upstanding marginal portions arranged adjacent the outer sides of the side walls, the bottom portions of the lowermost sinuous wire contacting the bottom, the upstanding marginal portions on the bottom having lugs thereon bent inwardly and downwardly over a horizontal wire of the wire side walls thus securing the bottom to the side walls.

2. A basket comprising open mesh wire side walls formed of sinuously-shaped and partially overlapped wires traversed by horizontal wires, said wires being mutually connected together at their points of contact with each other, an impervious bottom having upstanding marginal portions arranged adjacent the outer sides of the side walls, the bottom portions of the lowermost sinuous wire contacting the bottom, the upstanding marginal portions on the bottom having lugs thereon bent inwardly and downwardly over a horizontal wire of the wire side walls thus securing the bottom to the side walls, the uppermost portions of the top sinuous wire of the side walls being bent inwardly to provide openings at the tops of the side walls and arranged over the bottom through which flower stems may be inserted.

References Cited in the file of this patent

UNITED STATES PATENTS

| 1,037,539 | Rodgers | Sept. 3, 1912 |
| 1,616,894 | Finlayson | Feb. 8, 1927 |
| 1,890,983 | Griffith | Dec. 13, 1932 |
| 2,539,024 | Leiby | Jan. 23, 1951 |
| 2,572,486 | Isaac | Oct. 23, 1951 |

FOREIGN PATENTS

| 499,322 | France | Nov. 15, 1919 |
| 280,766 | Great Britain | Nov. 24, 1927 |